Figure 1:
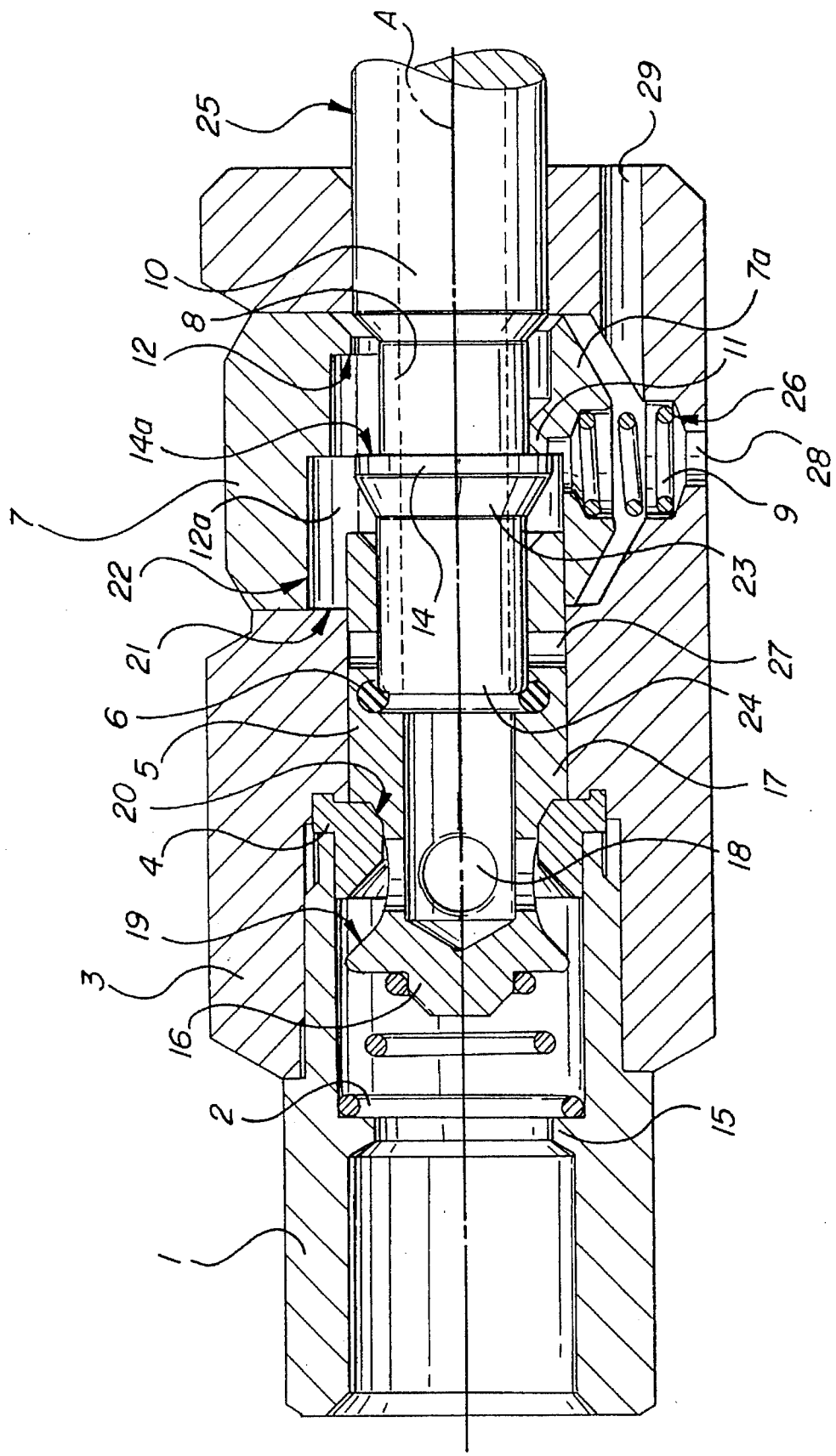

United States Patent [19]

Larbuisson

[11] Patent Number: 5,535,985
[45] Date of Patent: Jul. 16, 1996

[54] QUICK COUPLING FOR PRESSURE CONDUIT WITH CONTROLLED DISENGAGEMENT

[75] Inventor: Patrick Larbuisson, Paris, France

[73] Assignee: Societe Y.T.O., France

[21] Appl. No.: 425,148

[22] Filed: Apr. 19, 1995

[30] Foreign Application Priority Data

Apr. 21, 1994 [FR] France .................................. 94 04783

[51] Int. Cl.⁶ ..................................................... F16L 37/28
[52] U.S. Cl. ..................................... 251/149.9; 251/149.1; 251/149.6
[58] Field of Search ............................. 251/149.1, 149.6, 251/149.9

[56] References Cited

U.S. PATENT DOCUMENTS

| | | | |
|---|---|---|---|
| 4,483,510 | 11/1984 | Palau et al. ........................... | 251/149.6 |
| 4,858,648 | 8/1989 | Smith, III et al. .................. | 137/614.04 |
| 4,863,201 | 9/1989 | Carstens ................................ | 251/149.6 |

Primary Examiner—A. Michael Chambers
Attorney, Agent, or Firm—Young & Basile

[57] ABSTRACT

A quick coupling conceived for conduits under pressure comprise a latch which permits the disengagement of a male portion (10) from a female portion (1, 3) in two phases. During the first phase the male portion (10) retracts a controlled distance from its fully engaged position and arrives in an intermediary position in which the valve (5) of the female portion (1, 3) is closed. It further comprises openings (27, 28, 29) for the escape of the fluid under pressure, which openings are situated downstream from the valve (5) and this openings are opened during the said first phase of disengagement.

In the final phase, the male portion (10) is completely disengaged from the female portion.

The controlled disengagement in two phases is effectuated by the cooperation of a latch comprising two actually distance teeth which are positioned in a manner as to oppose each other with respect to the circumferential surface of the male portion in order to alternatively engage of disengage a projection-groove (14) of the male portion.

The control disengagement in two phases avoids a shock which will otherwise be produced during uncontrolled disengagement of the two portions of a coupling in a circuit under pressure.

10 Claims, 4 Drawing Sheets

QUICK COUPLING FOR PRESSURE CONDUIT WITH CONTROLLED DISENGAGEMENT

The present invention relates to a quick coupling comprising a male portion and a female portion, wherein the male portion may be inserted into the female portion and comprising a latch having two withholding teeth which are arranged on either side of the male portion in order to cooperate with withholding means on the male portion, thus as to produce a disengagement of the male portion from the female portion in two phases corresponding to one single pressing and releasing of said latch, whereby said female portion comprises a closing valve which is urged towards its closed position when said male and female portions are disengaged and which is open as a result of the insertion of the male portion into the female portion.

A quick coupling as described hereinabove is described in French patent 2 514 855, wherein the latch comprises three withholding teeth, whereof two are arranged axially separated within the interior of an axial boring of the latch, such as to define a certain axial distance along which the male portion may move, whereby two teeth are arranged on the same side of the radial boring of the latch relative to the male piece which is inserted into said axial boring of the latch, and a third tooth is arrange in an axial position between two first teeth and on the oposite side of the radial boring of the latch.

Thus, a shoulder which is formed at the outer surface of the male portion is latched in its completely coupled position by a first one of the two first teeth, and an initial pressing of the latch releases this first tooth from the shoulder of the male portion at the same time as the third tooth enters into the axial passage of the shoulder of the male portion during the retracting movement of the male portion, whereby the later retracts along an axial distance corresponding to the axial distance between the first and the third tooth.

Thereafter, the latch is released in order to return into its initial position, urged by a spring, and the third tooth will thereby be disengaged from the shoulder of the male piece and at the same time the second of the first two teeth will engage into the axial passage of the shoulder of the male piece in order to permit that the male piece may retract again along an axial distance corresponding to the difference between the axial positions between the third and the second tooth which retains the male piece in a third axial position before said male piece may finally be released by a second pressing of the latch which retracts said second tooth from the shoulder of the male piece, thus permitting complete extraction of the male piece whereafter the latch is again released and returns in its initial position.

Thus, the male piece is disengaged from its connection with the female portion by a sequence of two pressing operations on the latch, the first pressing permitting a partial disengagement during which the portion of the fluid under pressure which is located downstream of the valve may escape from the coupling before a complete disengagement of male and female portions, which has the advantage to avoid a shock occasioned by the residual pressure in the coupling during disengagement or even before the complete closure of the valve.

However, that the complete disengagement necessitates a double action of the latch which produces the progressive disengagement of the male portion, and it is therefore one of the objectives of the present invention to create a quick coupling comprising a latch which permits controlled disengagement of male and female portions during a single pressing and releasing of the latch, whereby the advantages of the escape of the residual pressure before complete liberation of the male piece are maintained.

French patent application 2 511 115 describes a coupling comprising two independent axially separated latches which necessitate also a double action for release.

French patent application 1 503 989 describes a system having a single latch which produces a retraction of the male piece in two phases during a single action of the latch.

However, the engagement of the male piece within the seal of the female portion is such, that the male portion is not disengaged from this seal or from the axial guiding portion respectively, when it is located in its intermediary position, so that the residual pressure is not rapidly released after a first partial retraction of the male piece.

It is therefore another object of the present invention to provide a quick coupling wherein the release of residual pressure may take place in sufficiently rapid manner in order to avoid accidental early release of the male portion from its intermediary position.

This object is obtained by a quick coupling as described hereinabove which is further charaterized in that the closing valve comprises a hollow cylindrical portion which receives the front portion of the male portion and which comprises a seal for sealing the connection between the valve and the male portion, said cylindrical portion comprising a plurality of radial openings downstream from said seal and in that said first two teeth are separated one from the other by an axial distance sufficient in order to permit a retraction of the male portion relative to the female portion during a single pressing of the latch in order to close the valve and disengage said openings in order to permit the escape of the residual pressure fluid downstream of the valve, while maintaining the male portion within the female portion, whereas subsequent release of the latch results in a complete disengagement of the male portion from the latch.

According to a preferred embodiment of the invention the coupling may comprise a male portion and a female portion within which the male portion may be inserted during the coupling operation, said female portion comprises a closing valve which is urged towards its closed position when the male and female portions are disengaged and which is opened by the movement of the male portion during its insertion into the female portion, said female portion comprises a latch capable of being moved in a direction perpendicular to the longitudinal axis of the female portion between a rest position and a working position, whereby said latch comprises whithholding teeth which engage with a circumferential groove or projection of the male portion, so that the movement of the latch may block the groove or the projection against an axial movement in the sense of a complete liberation thereof, whereby the male portion comprises a circumferential shoulder between a circumferential projection and circumferential groove, one of said teeth being disengaged from the axial trajectory of the shoulder and the second tooth being located within the axial trajectory of the shoulder when the latch is in its rest position, whereas the first tooth is located within the axial trajectory of the shoulder and the second tooth is disengaged from said axial trajectory when the latch is located in its working position, whereby said latch comprises two withholding teeth which are located axially separated one from the other by a distance sufficient to permit partial withdrawal of the male portion relative to the female portion during a single pressing of the latch in order to simultaneously close the valve and disengage the male portion from the valve so as to permit the escape of residual pressure of the fluid downstream of the closed valve, while maintaining the male piece within the female piece, whereby the release of the latch produces complete disengagement of the male portion resulting from the withdrawal of the first tooth.

According to a different embodiment of the invention, the female portion may comprise a second seal provided to seal the interior of the female portion from the exterior when the valve is in its open position and further to act as a sealing means for the valve itself when said valve is its closed position.

According to a particularly preferred embodiment of the present invention, the valve may comprise a hollow cylinder having a closed front portion and a cylindrical portion provided with holes which may be closed by said second seal when the valve is in its closed position, whereby said cylindrical portion comprises two sections of different diameter of an axial hole, which form between them a shoulder and a circumferential groove which is provided for said second seal, whereby the portion of larger diameter receives the front part of the male portion.

In this embodiment, the female portion may comprise a spring solliciting the valve into its closed position.

The front portion of the valve may comprise a frustro-conical surface which is designed in order to match a corresponding frustro-conical surface of the first seal when the valve is closed.

In this same embodiment of a coupling according to the present invention, the section of larger diameter of the cylindrical portion of the valve may comprise several radial borings downstream from the first seal which permit, when the valve is closed and when the male portion has just been disengaged from said section of larger diameter of the cylindrical portion of the valve, to let the residual fluid under pressure, present within the cylindrical portion of the valve escape to the exterior.

Advantageously, the female portion of the coupling according to the present invention may comprise at a position downstream of the valve, a radial boring receiving the latch, said latch comprising a cylinder including an axial hole for the passage of the male portion.

According to another preferred embodiment of the invention the radial hole of the latch may comprise projections pointing towards the interior of the hole and thus forming said withholding teeth.

Advantageously the radial boring of the female portion is open on one side of the female portion and this opening is sufficiently large for the passing of the latch, and at the opposite side of this radial boring of the female portion there is a smaller opening which communicates with the radial openings of the portion of larger diameter of the cylindrical part of the valve in order to permit the residual fluid to escape from the interior of the valve to the exterior of the female portion before complete disengagement of the male and female portions.

The invention will now be described in more detail with reference to the drawings which illustrate examples of the invention.

Figure 2:
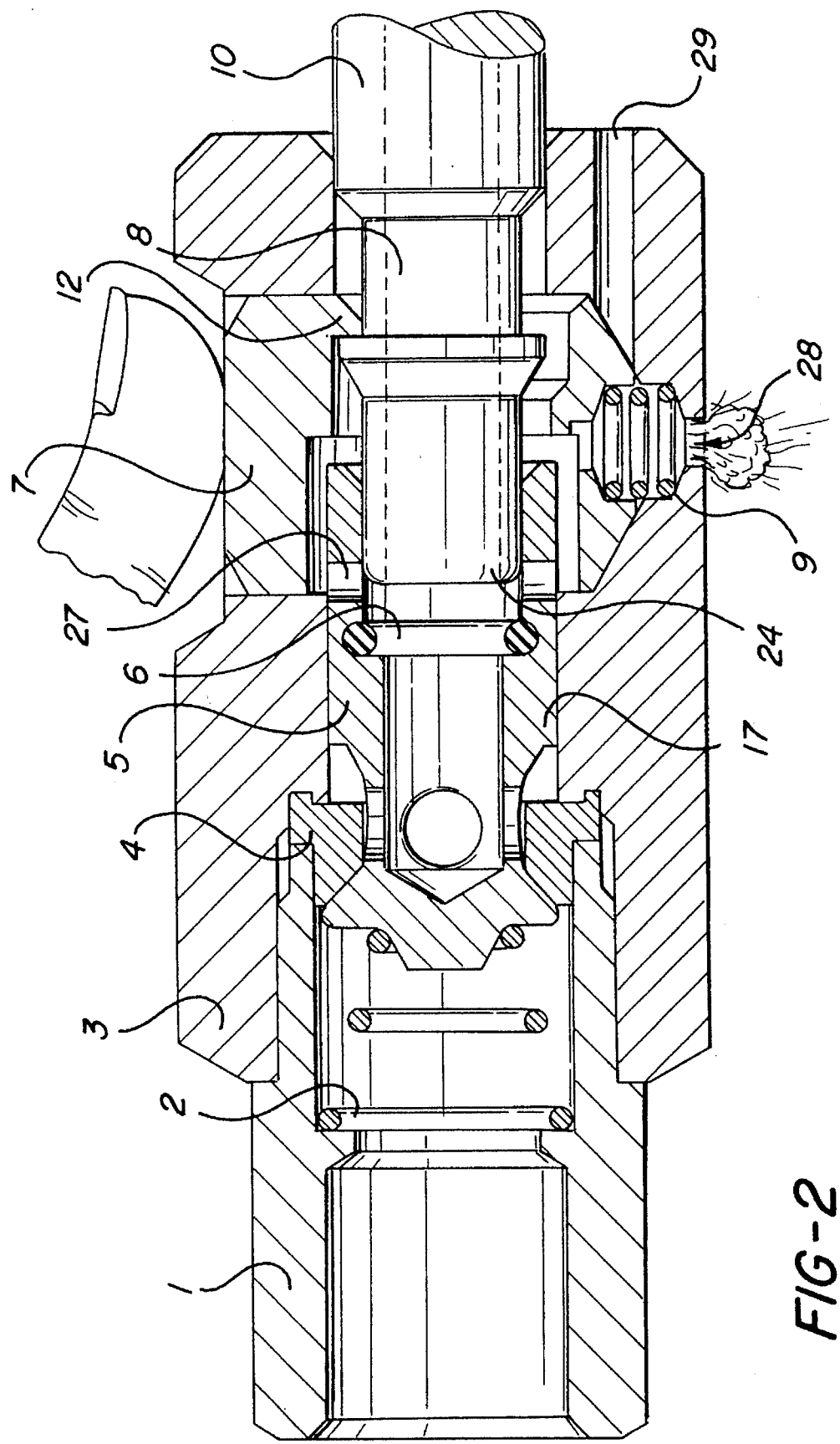
Figure 3:
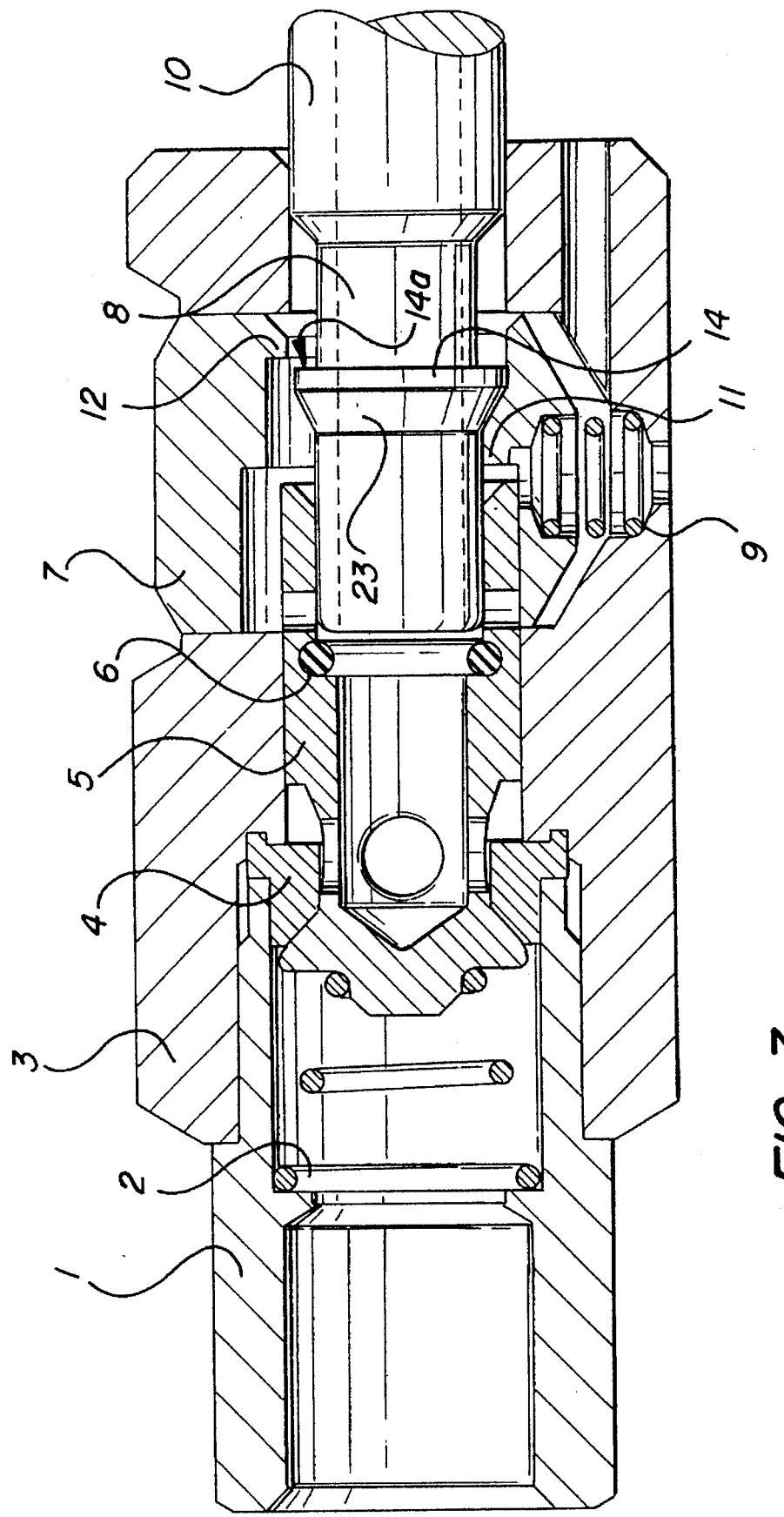
Figure 4D:
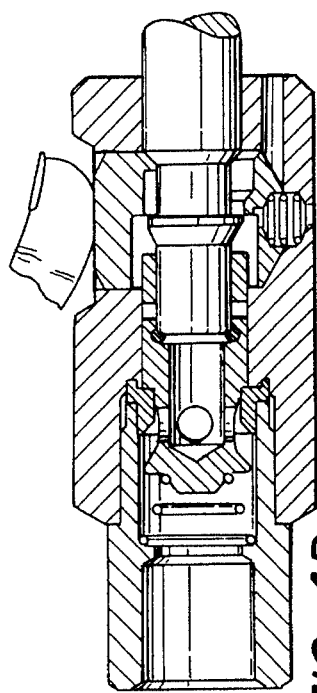
Figure 4E:
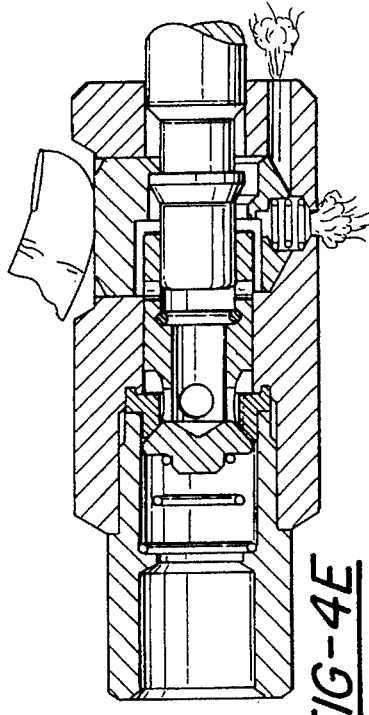
Figure 4F:
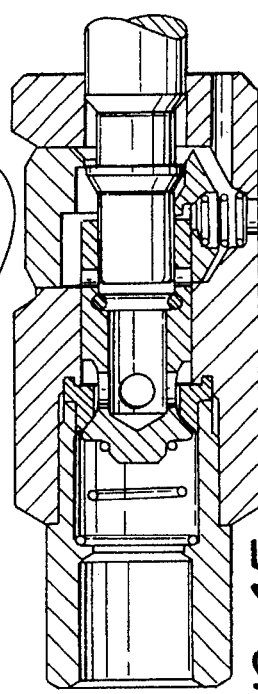
Figure 4A:
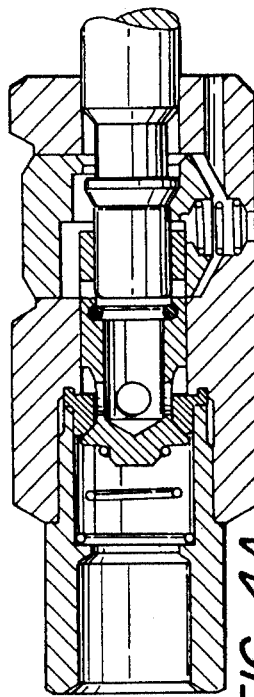
Figure 4B:
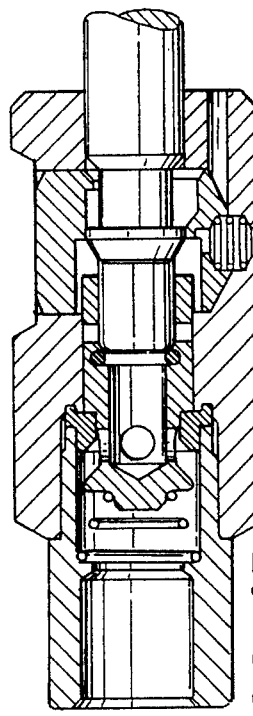
Figure 4C:
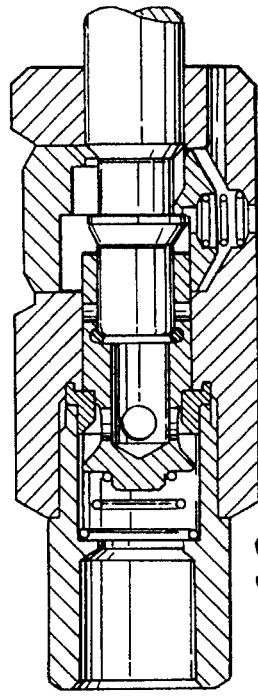

FIG. 1 illustrates a quick coupling according to the invention in a completely coupled position, FIG. 2 illustrates the same coupling in a partially disengaged position, permitting escape of the fluid under pressure, while maintaining the male portion within a retracted position after having pressed the latch, and FIG. 3 illustrates the coupling of FIG. 2 once the fluid under pressure has escaped and once the latch has returned to its initial position, FIG. 4a–4f illustrates the same coupling in a series of six phases beginning with a position immediately before the introduction of the male portion into the female portion until the position of disengagement corresponding to FIG. 3.

With reference to FIG. 1, a coupling according to the present invention is illustrated in its completely coupled position, whereby the left side of the drawing represents the upstream side corresponding to a source of pressurised fluid, and the right side of the drawing represents the downstream side in direction of which the fluid under pressure flows after complete connection of the coupling.

The female portion comprises a first cylinder 3, called outer cylinder, which comprises at its upstream side an interior threading, and a second cylinder 1 comprising at its downstream side an outer threading which is screwed into the interior threading of the outer cylinder, thus forming a housing for a first seal 4 which projects towards the interior of the two cylinders.

The interior cylinder 1 comprises a shoulder 15 forming a seat for a spring 2.

At the interior of the outer cylinder and also partially at the interior of the inner cylinder there is a valve 5 comprising a front part 16 as well as a hollow cylindrical portion 17 which is closed at its upstream side by said front part 16, said valve 5 being arranged in axially sliding manner within the interior of the axial open space of the outer cylinder, whereof the inner diameter is essentially equal to the outer diameter of the cylindrical portion 17 of valve 5 in order to permit exact guiding of valve 5 during its axial movement within the outer cylinder 3 during the different phases of coupling and disengaging of the male and female portions.

The cylindrical portion 17 comprises at its upstream end radial openings 18 and the front part 16 on one side and the cylindrical portion on the other side of these openings comprise a frustro-conical surface 19 as well as an annular surface formed by a polygonal generatrix 20 respectively designed to match identical surfaces of the seal 4 when the valve is in its closed or open position respectively.

FIG. 1 illustrates the open position of valve 5 where the "polygonal" surface is in contact with the seal 4 so that the openings 18 are open and permit the passage of fluid, under pressure or not, from the upstream side of the female portion into the interior of the valve, passing through the openings 18.

FIGS. 2 and 3 illustrate positions of the coupling in which the valve is closed, whereby the frustro-conical surface 19 of the front part 16 abuts on the frustro-conical surface of the sealing 4 in order to hermetically close the part of the female portion which is located upstream of the valve.

The cylindrical portion 17 of valve 5 comprises an inner boring having two sections of different diameter whereby the intersection between these two sections forms a shoulder adjacent to a circumferential groove in which a sealing 6 is housed, which is provided to sealingly close the interior of valve 5 and the interior of male portion 10 against the boring of the outer cylinder when the male portion 10 is completely connected within the female portion.

The outer cylinder 3 comprises a radial boring 21 having a diameter larger than the diameter of its axial boring, and said radial boring houses a latch of cylindrical shape which comprises a radial boring 22 which is positioned more or less coaxial with the axial boring of the outer cylinder 3 in order to permit the passage of male portion 10 through radial boring 22 of the latch.

The male portion 10 comprises an insertion end 24 having an exterior diameter essentially equal to the interior diameter of the section of larger diameter of cylindrical portion 17 of claim 5 whereby the insertion end 24 of the male portion 10 may be introduced into the cylindrical portion 17 of the valve until it abuts against seal 6.

Somewhat downstream of the insertion end 24 of the male portion 10, the later comprises a circumferential projection 14 accompanied by a frustro-conical portion 23 forming a ramp, the largest diameter of which corresponding to the outer diameter of the projection 14, and said projection 14 is followed, downstream, by a large groove 8 which extends until the wider portion 25 of the male portion 10 whereby a ramp of frustro-conical shape is formed between projection 8 and portion 25.

The radial boring 22 of latch 7 comprises a first tooth 12 situated on the accessible side of latch 7, and a second tooth 11 is positioned opposite of the first tooth 12 close to the inner end 7a of latch 7.

A spring 9 pushes against shoulder 26 of the radial boring 21 of the exterior cylinder 3 in order to solicit latch 7 into its rest position such as illustrated in FIG. 1.

In this rest position, tooth 12 is located so that it is at a radial distance from axis A of the coupling in order to stay outside of the axial trajectory of the projection 14 of the male portion 10.

In this rest position of latch 7, as indicated in FIG. 1, the second tooth 11 is located within the trajectory of the circumferential groove 14 and of the ramp 23 of the male portion 10 in order to permit locking of the male portion 10 in its completely coupled position as illustrated in FIG. 1, whereby the second tooth 11 either abuts against shoulder 14a of projection 14, or as indicated in FIG. 3 permitting, the introduction of the male portion into the female portion whereas ramp 23 slides over tooth 11, so as to drive latch 7 into its working position, until tooth 11 snapps behind circumferencial groove 14 as soon as the coupling is completed such as indicated in FIG. 1.

The section of larger diameter of cylindrical portion 17 of the valve 5 comprises, downstream of the second seal 6, radial openings 27 which permit, in the closed position of valve 5 as indicated in FIGS. 2 and 3, communication between the interior of the cylindrical portion 17 and the radial boring 21 of latch 7, said radial boring 21 comprising further an opening 28 near the shoulder 26 which plays the role of a seat for spring 9, so that a residual volum of pressurized fluid comprised within the cylindrical portion 17 of valve 5 and within the male portion 10 as well as in all downstream conduits may escape to the exterior during an operational phase of the coupling as illustrated in FIG. 2.

In order to disengage the male and the female portions, one simply presses manually or mechanically against the accessible end of latch 7, so that tooth 11 which is situated close to the interior end of latch 7 be disengaged of groove 14, whereas at the same time tooth 12 enters into the space constituting the trajectory of projection 14, however, this tooth 12 is located a certain axial distance downstream of tooth 11.

This pressing down of latch 7 permits thus a certain withdrawal of the male portion as a result of the pressure of the fluid or simply by manual traction in the case where the fluid is not under pressure until an axial position in which the shoulder 14a of projection 14 abuts against the shoulder 12a of tooth 12, in which position the male portion 10 is maintained as long as latch 7 is pressed down.

During this withdrawal, the end position of which is represented in FIG. 2, the valve is pushed into its closed position by spring 2 and by the pressure of the upstream fluid, and end 24 of the male portion 10 will be disengaged simultaneously from sealing 6 and, at least partially from radial openings 27 of the cylindrical portion 17 of the valve in order to permit the pressurized fluid present upstream of the valve to escape by openings 27, the radial boring 21 of latch 7 and finally throug opening 28 in order to eliminate any force which may be occasioned by the pressurized fluid downstream from valve 5, and thus permitting a complete disengagement of the male portion after withdrawal of tooth 12 into its initial position, corresponding to the rest portion of latch 7 which is illustrated in FIGS. 1 and 3, without danger of a shock which may normally be encountered during disengagement of male and female portions without restrictions, while the conduits downstream from valve 5 are still under pressure. A boring 29, parallel to axis A is provided in order to create a second escape trajectory for the pressurized fluid in case that opening 28 would accidentally be blocked by the hand of the operator.

In the position as indicated in FIG. 3, the interior of the conduits downstream of valve 5 is without pressure and the male portion 10 may be manually retracted, or be returned into its position of complete coupling by simply pushing the male portion so that tooth 11 slides along ramp 23 until it snapps behind shoulder 14a of circumferential projection 14 of the male piece.

FIG. 4 ilustrates subsequent phases of coupling and disengagement of the coupling illustrated in FIGS. 1 to 3, whereby position a) illustrates the phase immediately before complete connection, in which phase the valve is still closed and the latch is in its rest position.

In phase b) the male portion is almost entirely introduced into the female portion, the valve is open, hermetical sealing between the male portion and the valve is established by the appropriate seal and the tooth is in a position immediately before snapping behind the circumferential projection of the male piece.

In position c), the valve is open and the male portion is blocked in its position of complete connection by the second tooth which has just snapped behind the circumferential groove.

In phase d), the latch is illustrated in its pressed-down position so as to withdraw the second tooth from the trajectory of the circumferential projection and, as soon as this withdrawal is completed, the valve is closed under the action of its spring, while the male portion retracts until the circumferential projection abuts onto the first tooth of the latch which is situated at the side of the accessible end of the latch. This position is illustrated in phase e).

In this position the pressurized fluid which is contained in the conduits downstream from the valve may escape whereas the male portion assumes an idle position.

Thereafter, in phase f), the latch is released so that the second tooth abuts onto the insertion end of the male portion upstream from the circumferential projection and the male portion may now be completely withdrawn from the female portion.

The valve stays of course in its closed position during phases e) and f).

The invention has been described hereinabove with reference to a possible embodiment, it being understood that numerous modifications may be made by the man of the art without departing from the spirit of the invention.

The principle of the present invention resides in the fact to provide a complete disconnection of a coupling in a single pressing operation onto the latch and its subsequent release, so that the pressing-down of said latch permits a partial release between the male and female portions of the coupling, whereby the following release of the latch permits to completely disengage the two portions. The first phase of partial release produces an intermediary positioning of the male portion within the female portion during which the pressure of any fluid downstream of the valve of the female portion may quickly and securely be released before engaging into the second phase of the complete disengagement.

In order to permit this escape of the pressurized fluid downstream of the valve of the female portion, it is necessary to provide a retraction movement for the male portion which is triggered by pressing-down of the latch only, whereby this retraction movement is effectuated between its fully coupled and its partially disengaged position, and which permits simultaneously to close the valve and to open the conduits for the escape of the fluid.

I claim:

1. Quick coupling comprising a male portion and a female portion, wherein the male portion may be inserted into the female portion and comprising a latch having two withholding teeth which are arranged on either side of the male portion in order to cooperate with withholding means on the male portion, so as to produce a disengagement of the male portion from the female portion in two phases corresponding to one single pressing and releasing of said latch, whereby said female portion comprises a closing valve which is urged towards its closed position when said male and female portions are disengaged and which is open as a result of the insertion of the male portion into the female portion, characterized in that the closing valve comprises a hollow cylindrical portion which receives the front portion of the male portion and which comprises a seal for sealing the connection between the valve and the male portion, said cylindrical portion comprising a plurality of radial openings downstream from said seal and in that said first two teeth are separated one from the other by an axial distance sufficient in order to permit a retraction of the male portion relative to the female portion during a single pressing of the latch in order to close the valve and disengage said openings in order to permit the escape of the residual pressure fluid downstream of the valve, while maintaining the male portion within the female portion, whereas subsequent release of the latch results in a complete disengagement of the male portion from the latch.

2. Quick coupling according to claim 1, wherein the female portion comprises a second seal provided to seal the interior of the female portion from the exterior when the valve is in its open position and further to act as a sealing means for the valve itself when said valve is its closed position.

3. Quick coupling according to claim 1, wherein the valve comprises a hollow cylinder having a closed front portion and a cylindrical portion provided with holes which may be closed by said second seal when the valve is in its closed position, whereby said cylindrical portion comprises two sections of different diameter of an axial hole, which form between them a shoulder and a circonferential groove which is provided for said second seal, whereby the portion of larger diameter receives the front part of the male portion.

4. Quick coupling according to claim 3, wherein the female portion comprises a spring solliciting the valve into its closed position.

5. Quick coupling according to claim 3, wherein the front portion of the valve comprises a frustro-conical surface which is designed in order to match a corresponding frustro-conical surface of the second seal when the valve is closed.

6. Quick coupling according to claim 5, wherein the female portion comprises at a position downstream of the valve, a radial boring receiving the latch, said latch comprising a cylinder including an axial hole for the passage of the male portion.

7. Quick coupling according to claim 6, wherein the radial hole of the latch comprises projections pointing towards the interior of the hole and thus forming said withholding teeth.

8. Quick coupling according to claim 7, wherein the radial boring of the female portion is open on one side of the female portion and this opening is sufficiently large for the passing of the latch, and at the opposite side of this radial boring of the female portion there is a smaller opening which communicates with the radial openings of the portion of larger diameter of the cylindrical part of the valve in order to permit the residual fluid to escape from the interior of the valve to the exterior of the female portion before complete disengagement of the male and female portions.

9. Quick coupling according to claim 8, wherein the female portion comprises an additional hole in its front portion or at any other convenient location permitting the escape of fluid in case of accidental obturation of said smaller opening of said radial boring.

10. A quick coupling according to claim 1 wherein said male portion exhibits a circumferential shoulder and groove in axially contiguous relationship; said shoulder and groove being operative with said two withholding teeth to provide a complemental relationship of engagement between said teeth and said shoulder in opposite conditions of said latch such that when said latch is in one working condition, one of the teeth is in interfering relationship with said shoulder while the other is in non-interfering relationship and when the latch is in the opposite working condition, said one tooth is in non-interfering relationship and said other tooth is in interfering relationship thereby to provide staged withdrawal of the male portion from the female portion with one operation of the latch.

\* \* \* \* \*